(12) United States Patent
Burger et al.

(10) Patent No.: US 12,737,792 B2
(45) Date of Patent: Sep. 15, 2026

(54) AUTO-MATED PRICE PERFORMANCE OFFERS FOR CLOUD DATABASE SYSTEMS

(71) Applicant: Teradata US, Inc., San Diego, CA (US)

(72) Inventors: Louis Martin Burger, Escondido, CA (US); Frank Roderic Vandervort, Ramona, CA (US); Douglas P. Brown, Rancho Santa Fe, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/212,015

(22) Filed: Jun. 20, 2023

(65) Prior Publication Data

US 2024/0221039 A1 Jul. 4, 2024

Related U.S. Application Data

(60) Provisional application No. 63/478,146, filed on Dec. 31, 2022.

(51) Int. Cl.
*G06Q 30/0283* (2023.01)
*G06Q 30/0601* (2023.01)

(52) U.S. Cl.
CPC ..... *G06Q 30/0283* (2013.01); *G06Q 30/0629* (2013.01)

(58) Field of Classification Search
CPC ........................ G06Q 30/0283; G06Q 30/0629
See application file for complete search history.

(56) References Cited

U.S. PATENT DOCUMENTS

| | | | | |
|---|---|---|---|---|
| 9,479,382 | B1 * | 10/2016 | Ward, Jr. | H04L 67/62 |
| 2003/0212643 | A1 * | 11/2003 | Steele | G06Q 10/087 705/28 |
| 2021/0406967 | A1 * | 12/2021 | Vandervort | G06Q 30/0283 |

OTHER PUBLICATIONS

Koutris, Paraschos, et al. "Query-based data pricing." Journal of the Acm (JACM) 62.5 (2015): 1-44. (Year: 2015).*

* cited by examiner

*Primary Examiner* — Emmett K. Walsh
(74) *Attorney, Agent, or Firm* — James Stover

(57) ABSTRACT

In a cloud database system, a system and method for analyzing query workloads on installed customer systems and generating tiered offers promoting higher query execution speeds in the form of better response times for a selected portion of queries in exchange for a higher price. Upon selecting an offer, the cloud database system is automatically configured to include additional compute resources as required to execute future instances of the selected queries to take advantage of the performance improvements provided with the selected offer.

12 Claims, 7 Drawing Sheets

208
SQL REQUEST
300
SESSION CONTROL
302
PARSER
304
OPTIMIZER
306
DISPATCHER
EXECUTABLE STEPS 302
400
INTERPRETER
402
SYNTAX CHECKER
404
SEMANTIC CHECKER
406
DATA DICTIONARY CHECKER
OPTIMIZER
304

Customer *XYZ*: Price-Performance Offers

| Workload | Popular Queries | Total Count 30 days | Avg Response hh:mm:ss | Tier #1 Economy | Tier #2 *Express* | Tier #3 *Rush* | Tier #4 ***Hyper*** |
|---|---|---|---|---|---|---|---|
| Sales & Inventory | select count(c1) from sales, stores .. | 560 | 00:30:10 | 20% avg slowdown<br>10% price decrease | 10% avg speedup<br>5% price increase | 20% avg speedup<br>15% price increase | **40% avg speedup**<br>30% price increase |
| | select min(c2) from inventory .. | 245 | 00:21:03 | | | | |
| | ... | .... | ... | | | | |
| | ... | ... | ... | | | | |
| Analytics | select .. from NPath | 32 | 02:15:02 | 30% avg slowdown<br>15% price decrease | 10% avg speedup<br>10% price increase | 20% avg speedup<br>25% price increase | **40% avg speedup**<br>50% price increase |
| | select .. from DecisionForest | 25 | 01:45:20 | | | | |
| | ... | ... | ... | | | | |
| | ... | ... | ... | | | | |

FIG. 6 – Sample Customer Offer with Price-Performance Tiers

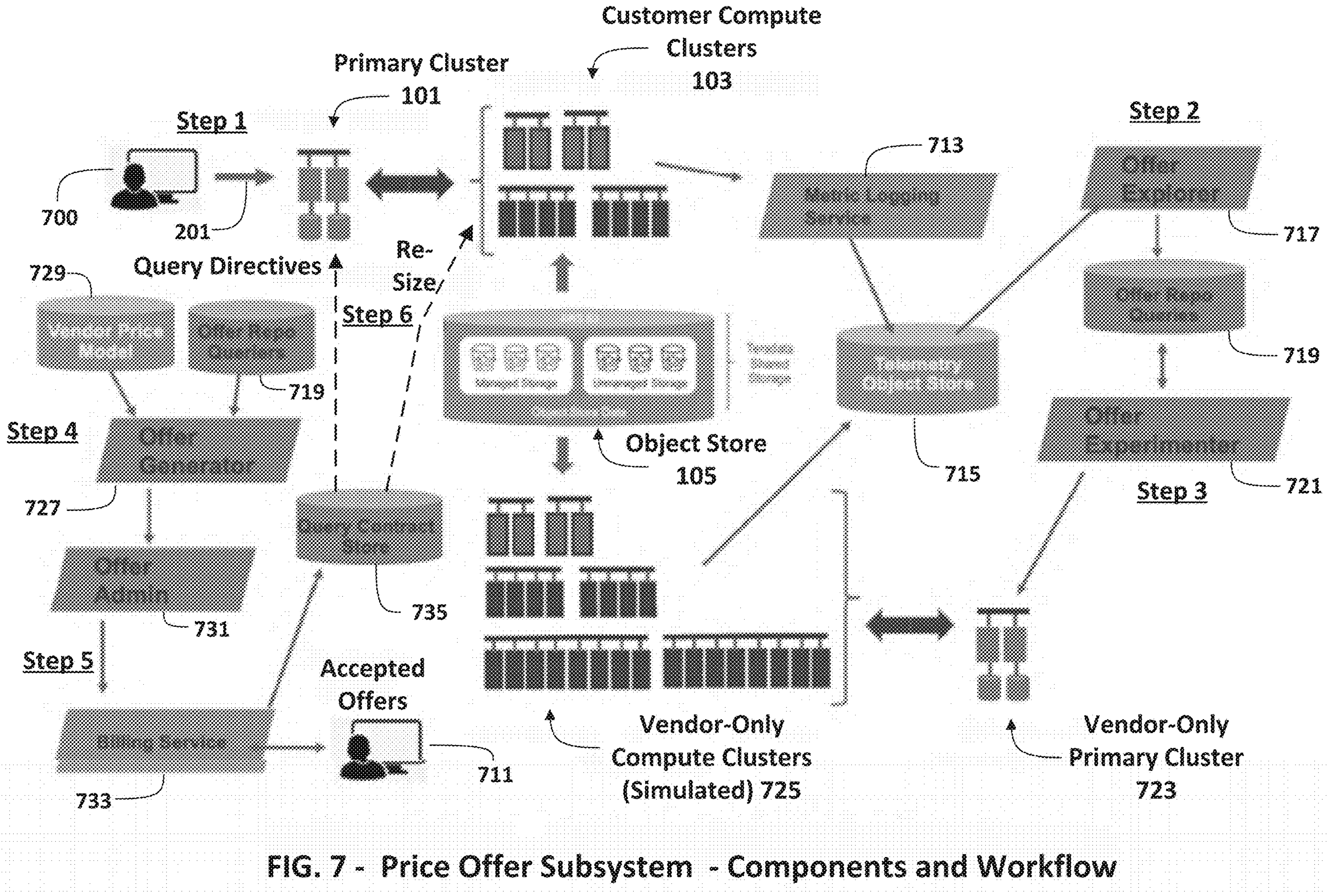
FIG. 7 - Price Offer Subsystem - Components and Workflow

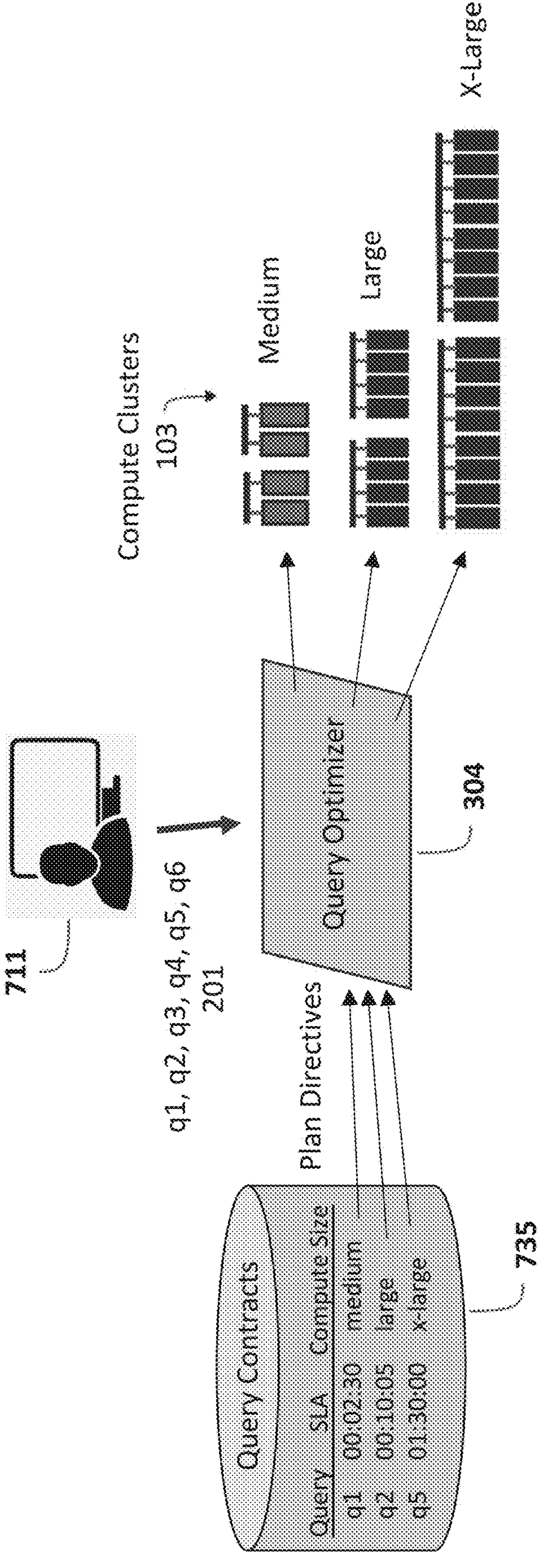
FIG. 8 - Query Contract Store

AUTO-MATED PRICE PERFORMANCE OFFERS FOR CLOUD DATABASE SYSTEMS

CROSS REFERENCE TO RELATED APPLICATIONS

This application claims priority under 35 U.S.C. § 119(e) to the following and commonly assigned patent application, which is incorporated herein by reference:

Provisional Patent Application Ser. No. 63/478,146, entitled "AUTOMATED PRICE-PERFORMANCE OFFERS FOR CLOUD DATABASE SYSTEMS," filed on Dec. 31, 2022, by Louis Martin Burger, Frank Roderick Vandervort, and Douglas P. Brown.

FIELD OF THE INVENTION

This invention relates generally to database management systems and external object storage systems, and more particularly to improved methods for optimizing workload performance and costs within database management systems employing external cloud storage, such as public and private cloud storage solutions including Amazon Web Services (AWS), Microsoft Azure, Google Cloud, IBM Cloud, and others.

BACKGROUND OF THE INVENTION (Note: This application references a number of different publications as indicated throughout the specification by one or more reference numbers within brackets [x]. A list of these publications ordered according to these reference numbers can be found below in the section entitled "References." The Reference section also lists some publications that are not explicitly referenced in this application. Each of these publications, including those that are not explicitly referenced, is incorporated by reference herein.)

A cloud native database is a database that is designed and architected to operate on the cloud with the capability to perform all of the functions of a traditional data warehouse, including data processing, collation, integration, cleansing, loading, reporting, and so on. Teradata Corporation VantageCloud Lake [1] is a cloud native database systems designed to automatically leverage elastic, fully isolated multi-compute clusters, as well as highly scalable, elastic, durable and cost-optimized object storage, such as Amazon Simple Storage Service (Amazon S3), so that customers can quickly and easily respond and adapt to changing business needs.

Teradata Corporation VantageCloud Lake offers compute elasticity capable of running database queries at higher levels of parallelism which can potentially deliver better response times. These higher speeds generally come at an extra cost to the customer who must weigh the tradeoffs between price and performance within the context of their business requirements. To facilitate such decisions, systems and methods for analyzing query workloads on already installed customer systems and generating tiered offers are presented below. Such offers promote higher speeds in the form of better response times for a selected portion of queries in exchange for a higher price. Upon selecting an offer, the system will automatically resize selected compute clusters as necessary to provide improved performance and execute future instances of the promoted queries to take advantage of the resized compute cluster configuration.

BRIEF DESCRIPTION OF THE DRAWINGS

Some implementations of the present disclosure are described with respect to the following figures.

FIG. 6 is a table providing sample offers generated by the offer process in accordance with the present invention.

FIG. 7 illustrates offer process components and workflow in accordance with one embodiment of the present invention.

FIG. 8 illustrates the use of a Query Contracts Store to optimize compute cluster configurations in accordance with one embodiment of the present invention.

DETAILED DESCRIPTION OF THE INVENTION

Figure 1:
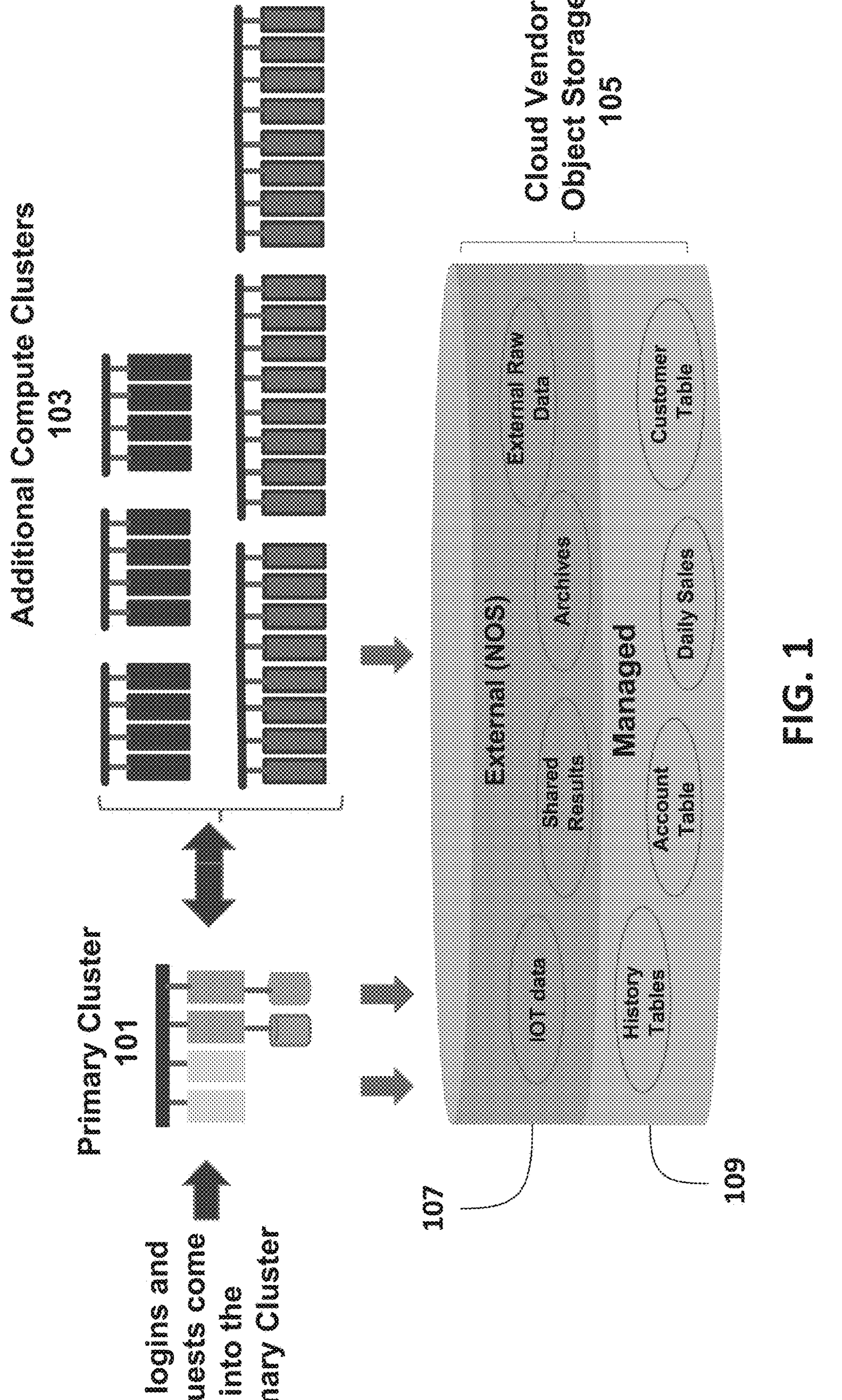
FIG. 1 is a block diagram of an example cloud native database arrangement that includes one or more database management nodes and an object-based remote data store.

FIG. 1 provides a basic block diagram of a VantageCloud Lake database environment. The major components of this system include a primary compute cluster 101, an analytics database forming the hub of the system environment; optional additional compute clusters 103, independent compute resources used to offload compute-intensive query steps from primary cluster 101; and cloud object storage 105 housing data which consists of data in external object storage 107 accessed using native object store (NOS) and owned and managed outside the database; and managed data 109 such as user tables, especially large tables, that are part of the database and can be shared by all compute clusters 103, but stored in cloud storage to reduce storage costs.

A parallel, scalable network connection is provided between primary cluster 101 and multiple compute clusters 103. This connection provides load balancing between multiple compute clusters and transfers finalized query steps to the compute clusters for execution.

Figure 2:
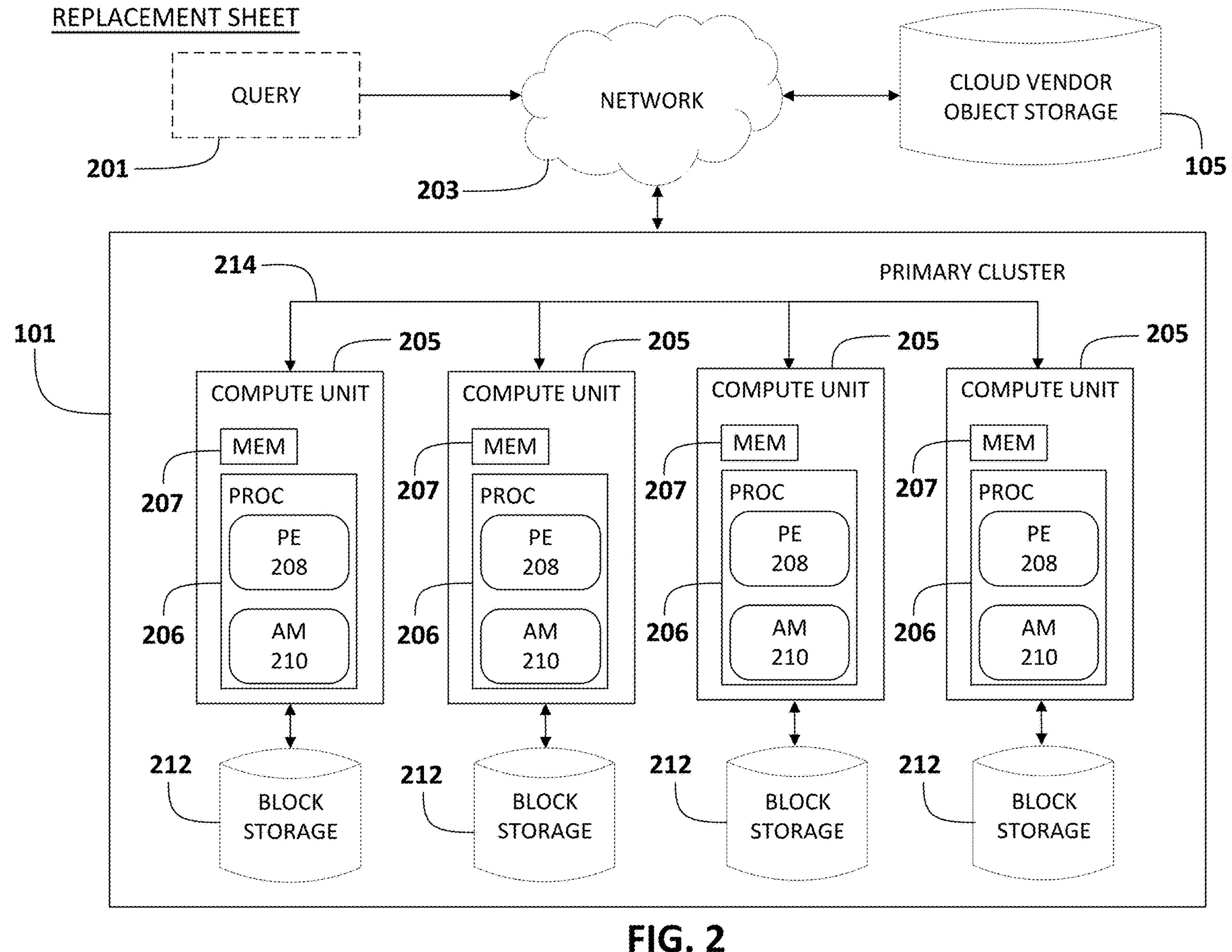
FIG. 2 is a block diagram of a database management node cluster encompassing a database management system.

Primary cluster 101 contains a database management system consisting of one or more network compute units or nodes 205 that manage the storage, retrieval, and manipulation of data stored on one or more block storage disks 212 as shown in FIG. 2. The database management system may be a combination of software (e.g., computer program routines, subroutines, applications, etc.) and hardware (e.g., processors, memory, etc.).

Generally, requests in the form of queries 201 are transmitted via a network 203 to the primary cluster 101, and responses are received therefrom. The database management system of primary cluster 101 performs the workload comprised of the one or more queries 201 against a relational database comprised of one or more tables storing data. Specifically, the database management system performs the functions described below, including accepting the workload comprised of the queries 201, generating one or more query execution plans (QEPs) from the queries 201, and then performing the query execution plans to process data retrieved from the tables. Moreover, the results from these functions may be provided directly to clients, may be provided to other systems (not shown) by network 203, or may be stored by the data management system in the database.

As shown in FIG. 2, primary cluster 101 is connected to cloud-based store 105 via a cloud network interface 203, wherein the cloud-based store 105 stores one or more objects (not shown), such as one or more datasets storing data. The cloud-based store 105 may be a distributed object store such as Amazon Simple Storage Service (Amazon S3), or a distributed file system such as Hadoop Distributed File System (HDFS). The database management system may retrieve the data from the objects in the cloud-based store 105, wherein the data is then stored in the relational database for use by the database management system in processing queries 201.

In one example, each compute unit 205 may include one or more physical processors 206 and memory 207. The memory 207 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 206 such as multiprocessing, multitasking, parallel processing and the like, for example.

The compute units 205 may include one or more other processing units such as parsing engine (PE) modules 208 and access modules (AM) 210. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors.

The parsing engine modules 208 and the access modules 210 may each be virtual processors (vprocs) and/or physical processors. In the case of virtual processors, the parsing engine modules 208 and access modules 210 may be executed by one or more physical processors, such as those that may be included in the compute units 205. For example, in FIG. 2, each parsing engine module 208 and access module 210 is associated with a respective compute unit 205 and may each be executed as one or more virtual processors by physical processors 206 included in the respective compute unit 205.

In FIG. 2, each compute unit 205 may include multiple parsing engine modules 208 and access modules 210, such that there are more parsing engine modules 208 and access modules 210 than compute unit 205.

The database management system stores data in one or more tables in block storage 212. In one example, the database system may be configured to distribute rows across access modules 210 and their associated block storage 212. These rows may include rows read from object store 105. Each parsing engine module 208 may organize the storage of data and the distribution of table rows and columns. The parsing engine modules 208 may also coordinate the retrieval of data from block storage 212 in response to queries received through connection with a network 203. The network 203 may be wired, wireless, or some combination thereof. The network 203 may be a virtual private network, web-based, directly-connected, or some other suitable network configuration.

Figure 3:
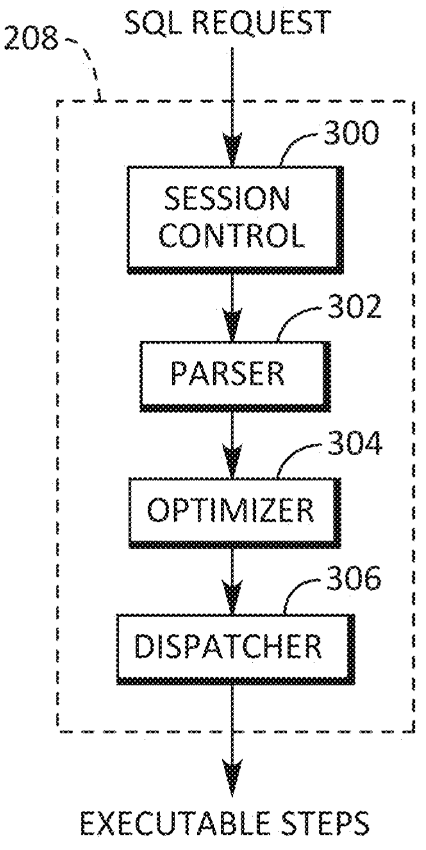
FIG. 3 is a block diagram of a parsing engine module within the example database management node cluster of FIG. 2.

In one example system, each parsing engine module 208 includes four primary components: a session control module 300, a parser module 302, an optimizer 304, and a dispatcher module 306 as shown in FIG. 3. The session control module 300 provides the logon and logoff functions. It accepts a request for authorization to access the database, verifies it, and then either allows or disallows the access. Once the session control module 300 allows a session to begin, an SQL request may be received such as through submission by a user and the SQL request is routed to the parser module 302.

Figure 4:
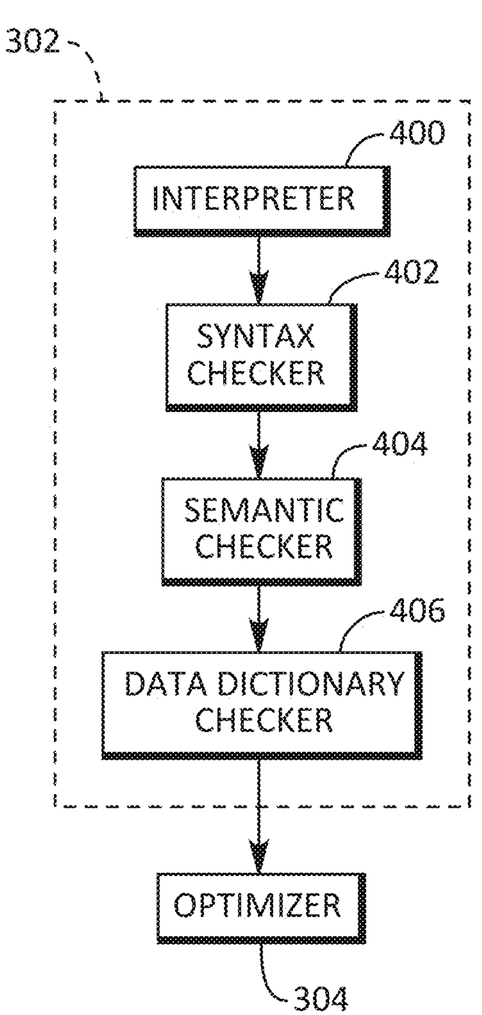
FIG. 4 is a block diagram of a parser module within the example database database management node cluster of FIG. 2.

As illustrated in FIG. 4, the parser module 302 may include an interpreter module 400 that interprets the SQL request. The parser module 302 may also include a syntax checker module 402 that checks the request for correct SQL syntax, as well as a semantic checker module 404 that evaluates the request semantically. The parser module 302 may additionally include a data dictionary checker 406 to ensure that all of the objects specified in the SQL request exist and that the user has the authority to perform the request. The parsing engine module 208 implements the optimizer module 304 to select the least expensive plan to perform the request, and the dispatcher 306 coordinates the runtime execution of executable steps of the query execution plan of the optimizer module 304 with the access modules 210.

Selecting the optimal query-execution plan may include, among other things, identifying which primary cluster 101, compute clusters 103, and compute units 205 are involved in executing the query and which database tables are involved in the query, as well as choosing which data-manipulation techniques will serve best in satisfying the conditions of the query. To this end, for each parsing engine module 208, the parser module 302 (see FIG. 3), and/or optimizer module 304 may access a data dictionary module (not shown) specifically for parsing engine module 208.

The data dictionary module may specify the organization, contents, and conventions of one or more databases, such as the names and descriptions of various tables maintained by database management system as well as fields of each database, for example. Further, the data dictionary module 406 may specify the type, length, and/or other various characteristics of the stored tables. The database management system typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system separately or in conjunction with SQL. The data dictionary may be stored in block storage disks 212 or some other storage device and selectively accessed.

Referring again to FIG. 2, an interconnection 214 allows communication to occur within and between each compute unit 205. For example, implementation of the interconnection 214 provides media within and between each compute unit 205 allowing communication among the various processing units. Such communication among the compute units may include communication between parsing engine modules 208 associated with the same or different compute units 205, as well as communication between the parsing engine modules 208 and the access modules 210 associated with the same or compute units 205. Through the interconnection 214, the access modules 210 may also communicate with one another within the same associated compute unit 205 or other compute units 205.

The interconnection 214 may be hardware, software, or some combination thereof. In instances of at least a partial-hardware implementation the interconnection 214, the hardware may exist separately from any hardware (e.g, processors, memory, physical wires, etc.) included in the compute units 205 or may use hardware common to the compute units 205. In instances of at least a partial-software implementation of the interconnection 214, the software may be stored and executed on one or more of the memories 207 and processors 206 of the compute units 106 or may be stored and executed on separate memories and processors that are in communication with the compute units 205. In one example, interconnection 214 may include multi-channel media such that if one channel ceases to properly function, another channel may be used. Additionally, or alternatively, more than one channel may also allow distributed communication to reduce the possibility of an undesired level of communication congestion among compute units 205.

Compute clusters 103 exist as separate clusters of network-connected nodes independent of primary cluster 101. Each compute cluster 103 is separate and may be specialized. Compute clusters 103 enable the extension and scaling of system compute power.

Figure 5:
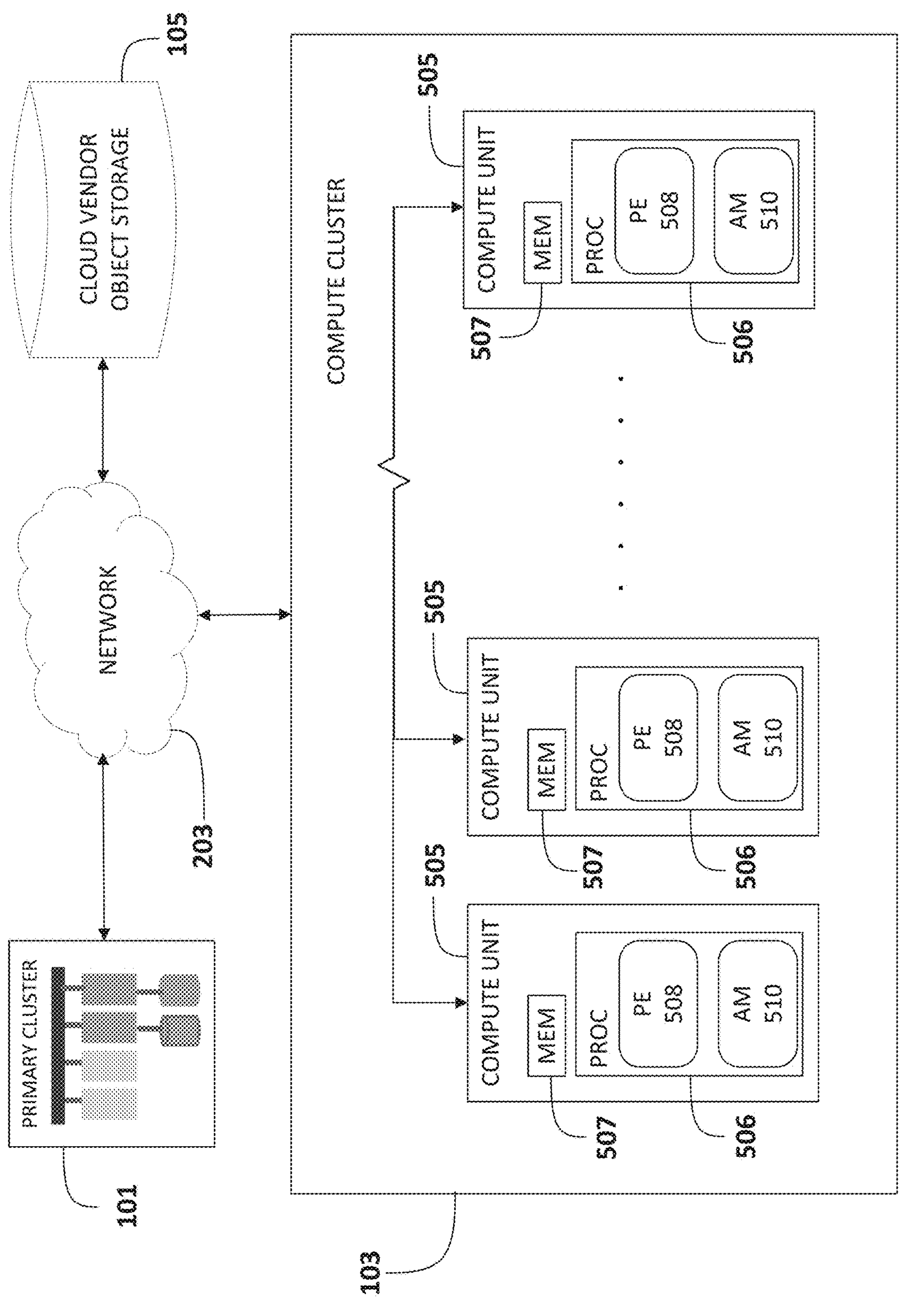
FIG. 5 is a block diagram of a compute node cluster.

As shown in FIG. 5, compute clusters 103 may contain one or more compute units or nodes 505, wherein each node 505 may include one or more physical processors 506 and memories 507. Compute clusters 103 include one or more parsing engine modules 508 and access modules 510, but unlike primary cluster 101, the compute clusters 103 do not have any persistent block storage for user data. Compute clusters 103 depend on the primary cluster parsing module 208 and optimizer 304 to direct the steps that the compute cluster will execute on behalf of a query. No query planning takes place on the compute cluster.

Compute clusters 103 do not have any permanent data. A data dictionary structure exists on a compute cluster, but it serves only the transient needs of the compute cluster. It does not contain table or column descriptions or details about statistics, indexes, or privileges. All that detail is maintained in primary cluster 101.

A compute cluster 103 can read large tables in object storage 105. It can also hold intermediate data, keeping it in memory or in internal drives.

Elasticity and extensible compute power is provided to the database platform via different quantities, configurations, and sizes of compute clusters 103. Each compute cluster 103 stands alone and executes queries that access object storage 105 to perform compute-intensive work such as analytic functions, freeing up primary cluster 101 to perform session management, parsing engine work, and tactical or other short-term work.

Depending on workload, a compute configuration may employ compute clusters having differing quantities of compute nodes 505 and processing capability. A compute cluster having a greater number of compute units or nodes 505 will accordingly have more processors 506, memory 507, access modules 510. With more access modules, a query or task assigned to a larger compute cluster can execute at a higher level of parallelism and deliver faster response times. Compute clusters can be categorized as either Small, Medium, Large, or X-Large depending upon the number of compute units or nodes 505 contained in a compute cluster 103.

A compute configuration may employ zero or many compute clusters, with compute clusters being added or removed to the configuration to meet workload needs. A compute configuration with zero compute clusters would consist of only primary cluster 101. Groupings of compute clusters can automatically scale up additional compute clusters based on resource demand or the number of active queries.

The optimizer 304 in the primary cluster 101 determines which query steps go to a compute cluster 103 and builds a query plan. During optimization, the work that a query needs to accomplish is broken into several steps. Some of these steps will execute on primary cluster 101, and if appropriate privileges are in place, some steps will execute on a compute cluster 103. Even if there are several compute clusters within a cluster configuration, a single query can only execute steps in one compute cluster. An execution plan may include processing a query step or two in primary cluster 101, and then processing one or more steps on a compute cluster 103. The compute cluster parsing engine 508 receives the query plan from primary cluster 101 and is responsible for dispatching steps down to the compute cluster access modules 510 for execution. When to use a compute cluster 103, what compute clusters to use, and the quantity of clusters to use, is determined by the optimizer in primary cluster 101 at the time the initial query plan is built.

Each cluster in the database environment is independent and isolated from other clusters, though queries can span a primary cluster 101 and one or more compute clusters 103 with communication between primary cluster 101 and compute clusters 103 occurring through a network connection 203. Data and instructions about how to execute query 201 may also be transmitted between the primary and compute clusters means of a data access layer referred to as data fabric, such as QueryGrid provided by Teradata Corporation. Results generated by compute clusters 103 are provided through the network or data fabric back to primary cluster 101.

As stated above, cloud native database systems such as Teradata Corporation VantageCloud Lake [1] offer different levels of compute services, referred to as tiers, where each tier presents a different level of system performance and price offered to a customer. The offer process described herein analyzes query workloads on already installed customer systems to generate tiered offers, such offers promoting better response times for a selected portion of queries in exchange for a higher price. Upon selecting an offer, the system will automatically resize selected compute clusters as necessary to execute future instances of the promoted queries to provide the level of system performance corresponding to the selected tier.

The offer process described herein generates offers specifically tailored to individual customers and their queries based on experimentation methods that forecast workload performance by emulating target systems. The invention embodiment described herein employs a novel technique that maintains a Query Contract Store that records compute power used during offer experimentations along with updated services level goals. The Query Contract Store then serves as an input to database query optimization processes, providing directives to optimization planning strategies for execution of future instances of the same queries.

Performance gains can be achieved at different stages within the lifespan of provisioning and managing a cloud database system and for different categories of workloads, e.g., tactical vs. decision support. The offer process focuses on previously installed customer systems that have undergone multiple billing cycles, establishing a baseline for both performance and cost. Furthermore, the process focuses on recurring queries whose service level goals (SLGs) are not rigid and potentially have varying degrees of business value depending on how quickly results are returned.

When experiments reveal that higher levels of parallelism produce a better response time and the customer accepts the offer, the system takes the necessary actions to deliver that performance by (a) resizing existing compute instances if the required larger size isn't available or (b) providing the optimizer with planning directives informing it of a query's new SLA (faster response time) and the suggested use of a larger compute instance to achieve it.

The offer process supports different pricing models including those that charge customers by uptime and configuration of compute node resources as well as more granular pricing models that charge for resource consumption at the individual query level. For example, if the charge for the currently active medium sized compute instance is $10 per hour and the large is $13 per hour then the advertised price increase is 30%.

Although the offer process described herein is directed to the use of compute, it can be extended to consider other options including a customer's current choice of storage class whose price-performance levels can vary dramatically between low-cost object stores and block file systems. It also extends to experimenting with different CPU architectures and memory technologies both of which offer different levels of price-performance.

Consider an installed cloud database system that is running three workloads as summarized in the table below. Customer XYZ has been using the provisioned system long enough to establish baseline performance and billing amounts and is generally satisfied but is considering performance improvements.

| Customer XYZ Workloads | Description |
|---|---|
| Sales & Inventory | "Run-the-business" reports with drop-deadlines but the sooner the better |
| CRM Services | Short running queries to provide near real-time recommendations - hard SLGs |
| Analytics | Complex analysis on various social media input - long running with soft SLGs |

After analyzing the logged telemetry for the above workloads for past billing cycles and performing experiments on the customer's data with varying compute sizes, the database vendor makes an offer as illustrated in FIG. 6.

The table shown in FIG. 6 provides sample offers for several popular customer queries shown in column 2. Offers are made for four tiers, labeled Tier #1 "Economy," Tier #2 "Express," Tier #3 "Rush," and Tier #4 "Hyper," with tiers 2 through 4 each representing an increased level of performance at an increased cost to the customer. Tier performance increases are expressed as percentage improvements to the current performance as reported in the Avg Response column. Similarly, price increases are expressed as relative percentage changes to the cost of the noted queries. It is important to note that such percentages may not increase in a linear fashion across tiers as the underlying execution costs are not always linear. A limited set of slowdown offers, represented as Tier 1, may be included to satisfy cost-conscious customers and promote an overall balanced offer sheet.

The offer process presented herein introduces the components listed in table below for generating and accepting offers. These components collectively operate as a price offer subsystem within a cloud native database system.

To promote an open and extensible platform, these components are implemented as micro services with well-defined APIs that can be called by system schedulers or tools designed to control workflow and perform routine maintenance tasks.

| Component | Description |
|---|---|
| Offer Explorer | Analyzes telemetry logs and identifies the subset of workloads and queries whose profile is promising for achieving speedup through increased compute levels. |
| Offer Experi-menter | Forecasts the performance of the Explorer's chosen queries on emulated compute clusters with varying instance sizes (level of parallelism). |
| Offer Generator | Creates offers based on Experimenter results for different speed tiers along with relative price increases computed by plugging in the experimental configurations and query resource usage into the vendor's pricing model. |
| Offer Admin-istrator | Customer accepted offers are enforced by resizing existing customer compute clusters to a larger size if necessary. Query level planning directives are stored in a Query Contract Store to replicate the query processing strategies used by the Experimenter to achieve the advertised speeds. |

FIG. 7 illustrates the offer process components and workflow within the context of Teradata Corporation's VantageCloud Lake architecture [1]. Compute clusters 103 consist of nodes whose size and number of active instances can vary. Primary clusters 101 parse and optimize SQL requests and orchestrate their execution on themselves and computer clusters. The following describes the numbered workflow steps illustrated in FIG. 7 along with methods for performing their tasks. Although the descriptions may refer to Teradata Corporation VantageCloud Lake specific features, they are generally applicable to all cloud databases architectures that separate compute and storage to support dynamic compute power and scalability.

Step 1—Baseline Workload Execution and Telemetry Collection

In step 1 of FIG. 7, customer applications 711 issue queries 201 against object stores 105 residing in storage services such as AWS Simple Storage System [2]. Queries are parsed and classified into workloads [3] on primary cluster 101 and then planned for execution on compute clusters 103 whose chosen size (level of parallelism) is based on the available configuration for the department of the submitting user and the customer specified service level goal (SLG), if any. Each of the active compute clusters 103 has been previously configured with an instance size along with the allowable range of active instances to support concurrency and throughput.

The offer process recognizes that in many cases, the currently configured SLG may be based on a user's incomplete understanding of what is possible, and the user may be inclined to negotiate for a better SLG if one can be realized. As queries are executed, a metric logging service 713 collects telemetry describing the query execution plan and its resource usage, e.g., CPU, IO, etc., and logs the collected telemetry within a designated repository 715 [4]. The active compute configuration along with query resource usage are inputs into the price model and the amount billed to customers.

Step 2—Offer Exploration

In step 2, the Offer Explorer component 717 performs a rule-based analysis on the telemetry with an emphasis on queries run during the latest billing cycle. The rules are designed to identify queries whose execution plan characteristics suggest an increased level of parallelism would improve query response times. Such profiles are commonly found in long running queries whose plans consist of multiple join steps and aggregation.

Exploration leverages any workload management related information [3] for the query including workload name, priority storage tier, and service level agreement (SLA).

Extending configured SLAs to include an optional user specified "hard" or "soft" label allows exploration to favor queries that are negotiable with respect to price-performance. Information for each selected query is written to a system repository (Offer Repo) 719 that is accessible by all offer related components.

Step 3—Offer Experimentation (Forecasting)

Emulation Methods:

In step 3, Offer Experimenter component 721 forecasts or predicts whether increased compute power has any impact on the response time of queries identified by Office Explorer 717. To avoid contention with customer submitted queries and provide a clear method for separately tracking resource usage and charges, experiments are performed on separate vendor-only primary clusters 723 along with emulated computer clusters 725.

Emulation [9] is performed on the vendor-only primary cluster 723 using established methods for performing query optimization and planning for a simulated target machine via specially marked definitions in the data dictionary.

Experiments consist of executing each Offer Explorer 717 identified query on different emulated compute instance sizes to determine the impact of increased parallelism. Starting with the next larger instance size above the current baseline, experiments continue with increasing sizes until improvements in response time are no longer observed for a given query. Compute instance size can be increased by adding additional compute clusters or replacing a compute cluster with a cluster having a larger number of compute units to the baseline configuration. As queries execute on compute clusters 725, the previously described telemetry is logged for the queries along with a designated QueryBand [5] indicating the queries are part of offer experiments and in turn used as input to the Offer Generator component 727.

Prediction with a Trained ML Model:

The emulation performed by Experimenter component 721 can be replaced by a trained model that takes as input (Query, Hypothetical Compute Cluster, Pricing Model) and predicts the resulting performance and price. Such models are workload dependent and difficult to fully train in-house, thus requiring local training on the customer system. Such local training can be performed on Experimenter 721 initiated queries, a subset of which can be performed on real (rather than simulated) compute clusters. Training can also be occur on the performance differences that result from customers accepting offers and subsequently resizing their instances. After sufficient training, the model and its prediction abilities can then replace the default Experimenter and its emulation mode.

Improved Accuracy with Real Compute Clusters

An alternative method for further improving the accuracy of experimentations is to execute customer queries on real compute clusters that are identical to those offered for customer use. The tradeoff for increased accuracy is the additional costs the vendor must pay for these service-only compute clusters. A separate compute cluster is configured for each supported instance size (Small, Medium, Large, X-Large). Multiple queries are run concurrently to simulate a compute cluster running at average usage levels. SQL queries that are actually UPDATE, DELETE, or INSERT-SELECT statements, will bypass their final write step operations to avoid changing customer data and avoid the need to apply locks that potentially block other requests. The remaining processes for this alternative method are identical to those previously described for emulation.

Step 4—Offer Generator

In step 4, Offer Generator component 727 reads Experimenter results saved to Offer Repository 719 and generates a set of tiered offers, such as illustrated in FIG. 6 (Economy, Express, Rush, and Hyper). Queries classified [3] to the same workload and having similar price-performance increases are grouped together for a common tier. The exact number of tiers can vary depending on the distribution of experiment results.

Experimenter component 727 records all relevant changes to the current baseline configuration that are relevant to the price model and provides them to Generator 727. The optimal compute size for each tier along with the corresponding query resource usage as collected by the telemetry service 713 are used as inputs to vendor's pricing model 729 to compute a premium (percentage increase) to the user's current billing. The offer process supports different pricing models including those that charge customer based up uptime and configuration of a node resource as well as more granular pricing models that charge for resource consumption at the individual query level.

Steps 5 and 6—Offer Administration and Query Contract

In step 5, Offer Administrator 731 communicates offers to customers using an established billing system 733. Accepted offers may require changes to a customer's current compute cluster configuration which in the case of Teradata's VantageCloud Lake requires changing the profile of a selected Compute Group (14) to employ a larger size, for example, employing multiple compute clusters 103 or compute clusters having larger quantities of compute units 505.

To enforce and deliver upon the agreed upon response times, a query contract is formed for each distinct query in Offer Repository 719 using a query representation introduced by Teradata's Query Expression Repository (QER) [6]. Each query expression (QE) stored in the QER is a concise representation of the Optimizer's internal parse tree for a query and includes methods for looking up identical (prior) instances.

The offer process labels each QE with a new SLA (response time) along with the compute size used to achieve it during the prior experimentation. Together, these QEs form a Query Contract Store 735 as illustrated in FIG. 8. Queries q1, q2, and q5 represent QEs under contract for delivering a faster SLA with a suggested compute size. Upon parsing future instances of these queries, Optimizer 304 will look to see if a matching QE exists in Query Contract Store 735 and, if found, will use this information as directives for query execution planning. The contracted SLAs supersede any SLAs associated with the parent workload that a given query is classified into. Queries q3, q4 and q6 are not part of the contract and retain their same SLAs with no custom planning directives.

CONCLUSION

The offer process described herein may include other methods for achieving performance gains including the use of faster storage classes or increased levels of isolation, and the use of different CPU architectures and memory technologies.

The offer process also extends to experiments involving automated physical design tuning including new indexes, alternative partitioning strategies, and collections of statistics to aid in query optimization. Autonomous tuning features can be temporarily enabled by the Offer Experimenter component to determine if performance gains are achievable and then permanently enabled upon a customer's acceptance of an offer.

The solution offers advantages not currently found in database cloud pricing: (i) customers are informed of potential improvements to their current performance and service level goals (SLAs), (ii) value and price can be established and agreed upon at an individual query level, and (iii) offers are pre-validated on the customer system. Lastly, organizing offers into different tiers of varying price performance levels along with representative queries broken down by workload presents customers with a variety of choices to match their individual budget.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

REFERENCES

[1] Teradata VantageCloud Lake—user documentation. docs.teradata.com/VantageCloud/Lake.

[2] Amazon Simple Storage Service (S3). https://aws.amazon.com/s3/.

[3] U.S. Pat. No. 7,657,501, by Douglas P. Brown, et al., titled "Regulating the Workload of a Database System," issued Feb. 2, 2010.

[4] U.S. Pat. No. 7,127,456, by Douglas P. Brown, et al., titled "System and Method for Logging Database Queries." issued Oct. 24, 2006.

[5] U.S. Pat. No. 8,280,867, by Douglas P. Brown, et al., titled "Identifying Database Request Sources," issued Oct. 2, 2012.

[6] U.S. Patent Application Publication Number 20210056106 A1, by Grace Au, et al., titled "Query Expression Repository," published Feb. 25, 2021.

[7] Amazon EC2 Instance Types. https://aws.amazon.com/ec2/instance-types/.

[8] Teradata VantageCloud Pricing. https://www.teradata.com/Cloud/Pricing.

[9] U.S. Pat. No. 10,261,888, by Douglas P. Brown, et al., titled "Emulating an Environment of a Target Database System," issued Apr. 16, 2019.

[10] Shivaram Venkataraman, Zongheng Yang, Michael J. Franklin, Benjamin Recht, Ion Stoica: Ernest: Efficient Performance Prediction for Large-Scale Advanced Analytics. NSDI 2016: 363-378.

[11] https://docs.teradata.com/r/Teradata-VantageTM-Native-Object-Store-Getting-Started-Guide/July-2021.

[12] https://docs.teradata.com/r/Teradata-VantageCloud-Lake/Loading-and-Storing-Data/Storing-Data/Object-File-System.

[13] https://docs.teradata.com/r/Teradata-VantageCloud-Lake/SQL-Reference/SQL-Data-Definition-Language/Compute-Cluster-Statements/Compute-Cluster-Group-Statements.

What is claimed is:

1. A database system comprising:

a primary cluster comprising at least one compute node, said compute node including a processor and a non-transitory storage medium containing instructions executable on said processor for executing a database management system (DBMS);

at least one additional compute cluster comprising at least one compute node;

the DBMS receiving a database query from a customer, wherein the database query comprises a DBMS action to be executed using at least one of said primary and additional compute clusters;

the DBMS determining multiple configurations of primary and additional compute clusters for executing said database query, each one of said configurations providing a different quantity of compute nodes and different parallel arrangement of said compute nodes, said configurations and performance metrics and costs associated with said configurations determined by said DBMS comparing said received database query with previously presented database queries, said DBMS determining performance metrics and costs for said previously presented database queries by executing said previously presented database queries on an emulated system of compute nodes and different parallel arrangements of said emulated system of compute nodes;

the DBMS presenting said multiple configurations and compute performances and costs associated with said configurations to said customer;

the DBMS automatically configuring said primary and additional compute clusters in accordance with a configuration selected from said multiple configurations by said customer; and the DBMS executing said database query using the configuration of primary and additional compute clusters corresponding to the configuration selected by said customer.

2. The database system according to claim 1, wherein said multiple configurations include configurations including different quantities of additional compute clusters.

3. The database system according to claim 1, wherein said multiple configurations include configurations including additional compute clusters having differing quantities of compute nodes.

4. The database system according to claim 1, wherein said multiple configurations are determined by evaluating database query execution performance on an installed customer system with varying primary and compute cluster arrangements.

5. The database system according to claim 1, further comprising an object storage accessible by both the primary cluster and additional compute clusters.

6. The database system according to claim 5, wherein:

said object storage is a cloud object storage; and said primary cluster, additional compute clusters, and said cloud storage are connected through a cloud native architecture.

7. A computer-implemented method, comprising:

executing a database management system (DBMS) in a database system, wherein the database system comprises a primary cluster comprising at least one compute node, said compute node including a processor and a non-transitory storage medium containing instructions executable on said processor for executing said DBMS, and at least one additional compute cluster comprising at least one compute node;

receiving by said DBMS a database query from a customer, wherein the database query is a DBMS action to be executed using at least one of said primary and additional compute clusters;

determining by said DBMS multiple configurations of primary and additional compute clusters for executing said database query, each one of said configurations providing a different quantity of compute nodes and different parallel arrangement of said compute nodes, said configurations and performance metrics and costs associated with said configurations determined by said DBMS comparing said received database query with previously presented database queries, said DBMS determining performance metrics and costs for said previously presented database queries by executing said previously presented database queries on an emulated system of compute nodes and different parallel arrangements of said emulated system of compute nodes;

presenting said multiple configurations and compute performances and costs associated with said multiple configurations to said customer;

automatically configuring by said DBMS said primary and additional compute clusters in accordance with a configuration selected by said customer; and executing said database query using the configuration of primary and additional compute clusters corresponding to the offer configuration selected by said customer.

8. The method of claim 7, wherein said multiple configurations include configurations including different quantities of additional compute clusters.

9. The method of claim 7, wherein said multiple configurations include configurations including additional compute clusters having differing quantities of compute nodes.

10. The method of claim 7, wherein said multiple configurations are determined by evaluating database query execution performance on an installed customer system with varying primary and compute cluster arrangements.

11. The method of claim 7, said database system further comprises an object storage accessible by both the primary cluster and additional compute clusters.

12. The method of claim 11, wherein:

said object storage is a cloud object storage; and said primary cluster, additional compute clusters, and said cloud storage are connected through a cloud native architecture.

* * * * *